May 12, 1970   H. P. ANDERSON   3,511,608
MULTIPLE LAYER PAPER TEST STRIP
Filed Dec. 14, 1967

INVENTOR.
HAROLD P. ANDERSON
BY Eckhoff and Hoppe
ATTORNEYS

United States Patent Office 3,511,608
Patented May 12, 1970

3,511,608
MULTIPLE LAYER PAPER TEST STRIP
Harold P. Anderson, 21650 Summit Road,
Los Gatos, Calif. 95030
Filed Dec. 14, 1967, Ser. No. 690,504
Int. Cl. G01n 31/22, 33/16
U.S. Cl. 23—253           9 Claims

ABSTRACT OF THE DISCLOSURE

A composite test strip for detecting chemical compounds consisting of two or more layers of paper impregnated with suitable chemical reagents so that a drop of material to be tested, containing a material normally undetectable by simple color change measurements, passes through the first paper where it is converted to a detectable compound and into the second paper where it is detected by a color change.

BACKGROUND OF THE INVENTION

Field of the invention

Paper test strip for detecting a compound normally undetectable by a simple color change test.

Description of the prior art

Paper test strips for performing colorimetric chemical determinations are well known, such as ordinary litmus paper. However, there are many chemical compounds such as nitrate nitrogen which are not detectable by a simple color test. Thus, it is ordinarily necessary in making a determination to employ liquid reagents. Since such tests are frequently made away from a laboratory as out in a factory or out in a field, and such reagents are frequently corrosive or otherwise dangerous chemicals, the carrying o fsuch liquid reagents involves a great deal of inconvenience as well as an actual hazard. It has been proposed to make paper test strips wherein two different chemicals are employed o na single sheet. However, these have not proved satisfactory in practice since it is difficult to keep the chemicals separated during the impregnation of the sheet so that such test strips have made no impression on the art.

SUMMARY OF THE INVENTION

Paper test strips for detecting chemicals which are ordinarily undetectable by simple paper tests wherein at least two strips are employed in superimposed relationship with one of the strips containing a reagent which converts the material under test to a detectable compound and the second of said sheets contains a material which will change color in the presence of the compound or in its altered form to be tested. Under some conditions, three or even more sheets may be superimposed and also inert sheets may be interposed to prevent chemicals from reacting prematurely. Instead of an actual chemical reaction, the first strip may serve to remove an impurity which would interfere with a test or to alter the pH or otherwise make a test more sensitive.

It is an object of the present invention to provide a paper test strip for testing chemicals ordinarily undetectable by a simple single colorimetric test.

Another object of the invention is to provide paper test strips which obviate the necessity of carrying liquid chemical reagents away from the laboratory.

Still another object of the invention is to provide a composite paper test strip whereby it is possible to utilize extremely minute quantities of a sample.

Another object of the invention is to provide a composite paper test strip which is simple and economical to manufacture.

A still further object of the invention is to provide a composite paper test strip wherein inert strips are employed between the active members to prevent premature reaction.

Other objects will be apparent from the balance of the specification.

DESCRIPTION OF THE PREFERRED EMBODIMENT

Figure 1:
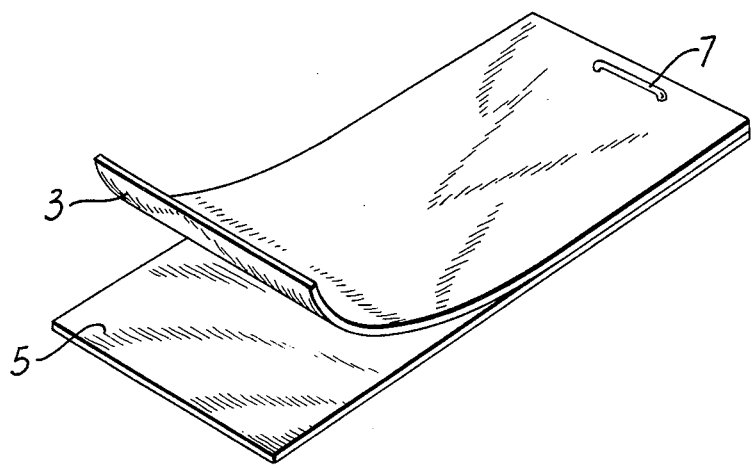
FIG. 1 is a perspective view of a composite paper test strip embodying the present invention employing two layers.

Referring to the drawings by reference characters, the invention is shown in its simplest form in FIG. 1. Here, a sheet 3 is superimposed upon a sheet 5 and the sheets are held in this superimposed relationship by means of a staple 7 or other suitable fastening means. The strip 3 and the strip 5 can conveniently be made of filter paper although any absorptive paper or similar material can be used. The strip 3 is impregnated with a chemical which will cause a chemical change or otherwise alter the material under test, while the paper 5 is impregnated with a material which will change color when a suitable chemical composition is applied thereto. For instance, in the detection of nitrate nitrogen, nitrates are ordinarily undetectable by a simple colorimetric test. In making such a test, it is necessary to reduce the nitrate to the nitrate form. Thus the paper 3 could be impregnated with an acid such as citric and allowed to dry. The paper 5 could be impregnated with a slurry of zinc dust, sulfamilic acid and 1- naphthylamine and allowed to dry. When a plant sap or other material or solution that one desires to test for the nitrate radical is applied to paper 3, the solution becomes acidified and is reduced by the action of the acid on the zinc dust on paper 5 to the nitrite form and a color will be developed by the aminoazo compound produced. The color will vary from light pink to red depending on the amount of nitrate in the drop applied.

Figure 2:
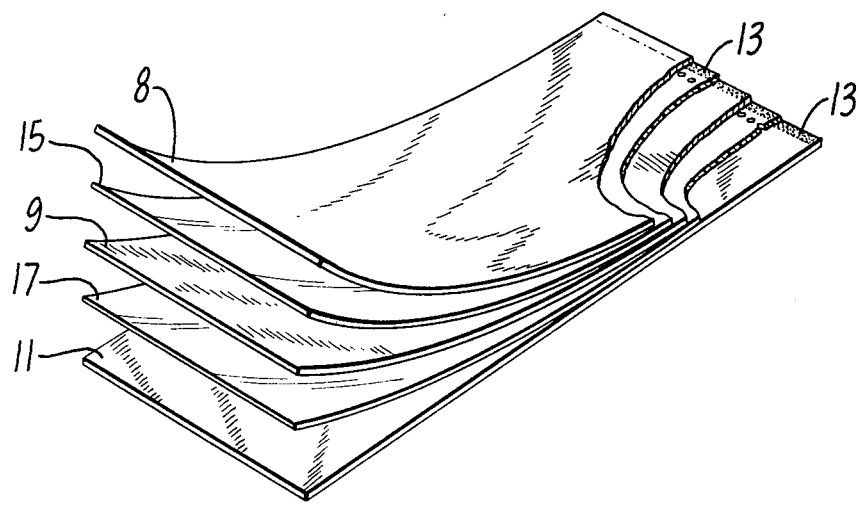
FIG. 2 is a view similar to FIG. 1 showing a test strip having three active layers and two inert layers.

In FIG. 2 a more complex embodiment of the invention is shown wherein three impregnated sheets, namely, 8, 9 and 11, are employed which are held in superimposed relationship by an adhesive as at 13.

Interposed between the impregnated strips are the thin sheets 15 and 17 of a water resistant inert material such as wax paper or plastic. Since some of the chemicals employed in making tests are hygroscopic, there is always the possibility of some chemical reaction between the materials which are used to impregnate the various sheets. Thus, the thin sheets 15 and 17 provide a water-tight barrier between the active sheets and, of course, are torn out and discarded before an actual determination is made.

The employment of a multiple test strip such as that shown in FIG. 2 is illustrated in Example IV.

The following non-limiting examples illustrate various preferred embodiments of the invention.

EXAMPLE I

Test for nitrate nitrogen

This is a method of determining nitrate nitrogen in plant sap of growing plants in the field. This is usually done by treating a fresh cut stem or other portion of a plant with a concentrated sulfuric acid solution of diphenylamine; the disadvantage is the necessity of carrying a concentrated acid solution into the field. This has often led to sad experiences.

The "Griess" test obviates the use of concentrated sulfuric acid but still several solutions are necessary. However, by the use of the dual test strips, no liquids need be carried into the field.

The principle of the Griess test is to reduce the nitrate to nitrite by the use of zinc in an acid solution and then let the nitrite react with sulfanilic acid to form a diazonium salt which reacts with alpha-naphthylamine to form a colored (pink or red) aminoazo compound.

Since powdered zinc and acid will react and become useless as a reducing medium, it is necessary to keep them separate until needed. This is where the dual test strips easily solve the difficulty.

In practice the test strips were prepared as follows:

Schleicher & Schuell filter paper #402 was employed. It was cut into strips 18¼ by 2¾ inches. An acid solution was prepared by dissolving

| | G. |
|---|---|
| Citric acid | 50 |

Water, quantity to make 225 ml.

The paper was impregnated with this solution and hung up to dry at normal temperature.

Another solution was made by mixing

| | G. |
|---|---|
| Gum arabic | 4 |
| Zinc dust | 2 |

Water, quantity to make 125 ml.

When thoroughly dispersed there was added to this a solution containing

| | G. |
|---|---|
| 1-naphthylamine-hydrochloride | ½ |
| Sulfanilic acid | 1 |
| Manganese sulfate | 1 |

Water, quantity to make 75 ml.

The whole was then made up to 225 ml. by adding water. Other strips were impregnated with this solution and hung up to dry.

These two large strips are then fastened together along an edge by the use of a waterproof cement or glue such as a plastic cement or a rubber cement. When the cement is dry the large strips can be cut into small strips about ½ inch wide and are ready for use.

The solution or plant sap to be tested is applied to the citric acid strip and allowed to soak or diffuse through to the indicating strip, which becomes colored, light pink, dark pink, or red, depending on how much nitrogen is in the test solution.

EXAMPLE II

Test for phosphorus

This use of the dual paper test strips was for the testing for phosphates. One paper was impregnated with a solution of citric acid and ammonium molybdate. The other paper was impregnated with a solution of stannous chloride. Both were then dried and the sheets stapled together. The test solution passing through the acid molybdate to the second paper gave the blue color due to the formation of the phosphomolybdic acid complex.

EXAMPLE III

Test for borates

Tumeric or curcumin gives a very sensitive test for borates when first changed to boric acid and then made alkaline. This is accomplished by impregnating one paper with curcumin and citric acid. The second paper is impregnated with sodium carbonate to give the dark blue green color.

EXAMPLE IV

Test for ascorbic acid (vitamin C) in fruit juices

For this test three test papers are used. (1) A strip coated with calcium carbonate held in suspension in the impregnating solution with gum arabic; (2) a strip with manganese dioxide in the capillaries. This is done by impregnating the paper with potassium permanganate; (3) a strip impregnated with benzidine hydrochloride.

To test, the fruit juice is placed on the calcium carbonate impregnated paper and allowed to soak through, which removes any citric acid and then reduces the manganese dioxide. The benzidine hydrochloride serves to accentuate the appearance of the unreduced manganese dioxide. To increase the sensitivity, the manganese dioxide strip and the benzidine strip may be first wet with water. The ascorbic acid leaves the manganese dioxide strip white or colorless while the rest of the strip is colored blue.

The above mentioned examples illustrate various uses of the dual and triple test strips.

The nitrate test shows how a simple test can be made where it is not possible to mix all the reagents beforehand. They are kept separate by being on different papers until wet by the solution to be tested.

The phosphorus test shows the use of the paper for reactions that must be done in succession.

The boron test illustrates how the dual papers are used to change the pH during the test procedure; an acid or low pH is used to make the reaction while the alkaline or high pH makes the color change more sensitive.

This same use of different pH conditions can be used for other reactions as for the test for manganese.

The ascorbic acid test illustrates two uses, that of removing impurities, as in this case citric acid. And then the third strip is used for just carrying the reagent and having it handy to make the test more sensitive.

In many of the uses of the multiple test strips they do not just show the presence of the element or radical but the intensity of the color gives a quantitative indication of the amount present.

Some times when using reagents which are hygroscopic, it may be desirable to insert a strip in between the test strips to keep the reagents apart, as is shown in FIG. 2. This strip is torn out immediately before use.

I claim:

1. A composite test strip comprising in combination at least two strips of absorbent material held in flat superimposed relationship, one of said strips being impregnated with a dry chemical which causes a chemical reaction when a liquid under test as to the presence of a given chemical is applied thereto and another of said strips being impregnated with a chemical which causes a color change which is characteristic of the given chemical when in contact with the reaction product of the first strip whereby the presence of the given chemical can be detected on the surface of the last of said strips.

2. A composite test strip in accordance with claim 1 wherein one of the strips serves to alter the pH of a test solution.

3. A composite strip in accordance with claim 1 wherein one strip serves to remove an impurity which would interefere with a test.

4. A composite strip in accordance with claim 1 wherein removable inert strips are provided between the impregnated strips.

5. A composite test strip in accordance with claim 1 wherein three impregnated strips are employed, the first two strips causing successive chemical reactions and the third strip causing a color change when contacted with the final reaction product.

6. A composite strip in accordance with claim 1 wherein a first strip is impregnated with an acid and a second strip impregnated with zinc dust, alpha-naphthylamine hydrochloride, sulfanilic acid and manganese sulfate.

7. A structure in accordance with claim 1 wherein one strip is impregnated with a solution of citric acid and ammonium molybdate and a second strip is impregnated with a solution of stannous chloride.

8. A composite test strip in accordance with claim 1 wherein one strip is impregnated with curcumin and citric acid and a second strip is impregnated with sodium carbonate.

9. A composite test strip in accordance with claim 1 wherein a first strip is impregnated with calcium carbonate, a second strip is impregnated with manganese dioxide and a third strip is impregnated with benzidine hydrochloride.

References Cited

UNITED STATES PATENTS

| | | |
|---|---|---|
| 2,083,206 | 6/1937 | Schoeller. |
| 2,379,459 | 7/1945 | Schreiber. |
| 2,633,410 | 3/1953 | Beckley. |
| 3,420,635 | 1/1969 | Davis. |
| 3,235,337 | 2/1966 | Artis _____ 23—253 |

MORRIS O. WOLK, Primary Examiner

S. MARANTZ, Assistant Examiner